(12) United States Patent
Michelotti (10) Patent No.: US 8,322,901 B2
(45) Date of Patent: Dec. 4, 2012

(54) ILLUMINATED VEHICLE WHEEL WITH BEARING SEAL SLIP RING ASSEMBLY

(76) Inventor: William M. Michelotti, Stamford, CT (US)

( * ) Notice: Subject to any disclaimer, the term of this patent is extended or adjusted under 35 U.S.C. 154(b) by 105 days.

(21) Appl. No.: 13/014,477

(22) Filed: Jan. 26, 2011

(65) Prior Publication Data

US 2011/0182080 A1    Jul. 28, 2011

Related U.S. Application Data

(60) Provisional application No. 61/299,199, filed on Jan. 28, 2010.

(51) Int. Cl.
 *B60Q 1/00* (2006.01)
(52) U.S. Cl. ............ 362/500; 362/473; 362/545
(58) Field of Classification Search ............ 362/473, 362/500, 543, 545, 54
See application file for complete search history.

(56) References Cited

U.S. PATENT DOCUMENTS

| | | | |
|---|---|---|---|
| 2,085,536 A * | 6/1937 | Liebel et al. ............. | 250/495.1 |
| 2,427,969 A * | 9/1947 | Lester .................. | 352/84 |
| 2,966,650 A * | 12/1960 | Earnest ................ | 439/16 |
| 4,353,110 A * | 10/1982 | Ellis ................... | 362/35 |
| 4,430,692 A | 2/1984 | Papadakis | |
| 4,881,153 A | 11/1989 | Scott | |
| 5,530,630 A | 6/1996 | Williams, Jr. | |
| 5,800,035 A * | 9/1998 | Aichele ................. | 362/511 |
| 5,876,108 A | 3/1999 | Chien | |
| 6,116,763 A | 9/2000 | King | |
| 6,168,301 B1 | 1/2001 | Martinez et al. | |
| 6,322,237 B1 | 11/2001 | Lee | |
| 6,513,962 B1 * | 2/2003 | Mayshack et al. ........ | 362/583 |
| 6,601,979 B1 | 8/2003 | Byrd et al. | |
| 6,619,823 B2 | 9/2003 | Dai | |
| 6,641,041 B2 | 11/2003 | Olds et al. | |
| 6,789,928 B2 | 9/2004 | Khan | |
| 7,079,042 B2 | 7/2006 | Reim | |
| 7,101,066 B2 | 9/2006 | Bond | |
| 7,123,134 B2 | 10/2006 | Thomas et al. | |
| 2002/0145330 A1 | 10/2002 | Abbe et al. | |
| 2003/0223243 A1 | 12/2003 | Miller | |
| 2005/0104738 A1 | 5/2005 | Todorov | |
| 2006/0038831 A1 | 2/2006 | Gilbert | |
| 2006/0226720 A1 | 10/2006 | Kratz et al. | |
| 2007/0058384 A1 | 3/2007 | Khan | |
| 2008/0034894 A1 | 2/2008 | Meyer et al. | |
| 2008/0101053 A1 * | 5/2008 | Hoffman et al. ........... | 362/35 |
| 2011/0182080 A1 * | 7/2011 | Michelotti ............... | 362/473 |

* cited by examiner

*Primary Examiner* — John A Ward
(74) *Attorney, Agent, or Firm* — St. Onge Steward Johnston & Reens LLC (57) ABSTRACT

An illuminated vehicle wheel assembly having arrays of illuminated electrical elements such as light emitting diodes, which are powered by the vehicle power systems by way of a slip ring assembly associated with the bearing or bearing seal of the vehicle wheel.

16 Claims, 10 Drawing Sheets

ILLUMINATED VEHICLE WHEEL WITH BEARING SEAL SLIP RING ASSEMBLY

The present application claims the benefit under 35 U.S.C. §119 (e) of Provisional Patent Application Ser. No. 61/299,199 for an Illuminated Wheel Bearing Seal Slip Ring Assembly filed on Jan. 28, 2010. The contents of Provisional Patent Application Ser. No. 61/299,199, filed on Jan. 28, 2010 are hereby incorporated by reference.

FIELD OF INVENTION

The present invention relates to the field of vehicular accessories, particularly, slip ring power transfer apparatus to transfer power to a rotating element such as a wheel, and most particularly, slip ring power transfer apparatus to provide power to electrically operated illumination elements such as LEDs located in a vehicle wheel.

BACKGROUND OF THE INVENTION

Motorcycle customization is a strong tradition among certain motorcycle riding communities. Custom motorcycle paint, exhaust, and fender systems are very popular. These customs have been further popularized by televisions shows such as "Orange County Choppers."

Decorative lighting systems have been proposed as one possible customization option. Such lighting systems can illuminate the wheels and/or the body of motorcycles. Lighting systems for motorcycle wheels provides a unique nighttime glow to the owner's vehicle.

Various decorative lighting systems have been conceived and/or implemented in automobiles, including underlighting and wheel well lighting systems. United States Patent Application No. 2003/0223243 A1 (Miller) discloses an illuminating automobile wheel device with light emitting diodes (LEDs) mounted on a circuit board, which is mounted onto a wheel. U.S. Pat. No. 7,079,042 (Reim) discloses a system for providing illuminated displays on a vehicle wheel having LEDs mounted on a tire and also having a vehicle rim to display lighted messages. U.S. Pat. No. 6,789,928 (Khan) discloses a lighted wheel rim system having a wheel body with voids, so that LEDs and a battery are mounted within. U.S. Pat. No. 6,641,041 (Olds et al.) discloses a system for directing a short burst of bright light onto rotating indicia on a vehicle wheel which makes the indicia on the rotating wheel appear to be stationary. U.S. Pat. No. 6,601,979 (Byrd et al.) discloses a wheel illumination device having a brush assembly in electrical contact with concentric conductor rings on a slip ring assembly mounted to the wheel. U.S. Pat. No. 6,322,237 (Lee) discloses a lighted wheel rim system having LEDs mounted within the rim of a tire. U.S. Pat. No. 6,116,763 (King) discloses a wheel illumination device requiring no external power and using magnetic and rotational forces to power the LEDs, however, such a system is inoperable when the wheels are not rotating.

Other prior art references include U.S. Pat. No. 5,800,035 (Aichele), which discloses a wheel lighting apparatus using fiber optics to illuminate a vehicle wheel; U.S. Pat. No. 4,881,153 (Scott) which discloses a vehicle wheel lighting system that comprises a disk assembly having conductive rings on a slip ring assembly mounted to the wheel; U.S. Pat. No. 4,430,692 (Papadakis) which discloses a wheel lighting apparatus using fiber optics to illuminate a vehicle wheel.

Other prior art references include United States Patent Application No. 2007/0058384 (Khan) which discloses a hub mounted electrical transfer assembly located adjacent the brake disc. Khan also discloses the transfer of electrical energy and control signals from a stationary electrical conductor at a fixed location on a motorcycle body to a rotating wheel. Also United States Patent Application No. 2002/0145330 (Abbe et al.) discloses an LED lighted ring on a motorcycle wheel. Abbe et al. also disclose a circuit board mounted to a rim of the tire ring which carries a pair of LEDs aligned with each of the apertures or openings on the rings.

The prior art devices use a number of different power systems, however, none of the prior art systems provide a generally-applicable design for a slip ring power transfer assembly to provide power to electrically operated lighting elements in a wheel that can be sold as a kit for installation in motorcycles made by many different manufacturers.

SUMMARY OF THE INVENTION

It is an object of the present invention to provide for an illuminated vehicle wheel with a slip ring located as part of or adjacent to a bearing seal, and an external brush assembly electrically connected to the slip ring. The slip ring is within the wheel's bearing bore or attached to the face of the wheel's bearing bore to maintain concentricity. This may or may not replace the bearing seal depending on space available between the face of the wheels bearing bore and any adjacent components.

It is another object of the present invention for this assembly to be especially adapted for retrofitting existing motorcycle wheel systems with an illuminated wheel.

It is another object of the present invention to provide a slip ring incorporated into a wheel bearing assembly operably connected to the vehicle power system, by which a vehicle wheel receives power through the bearing seal slip ring and external brush assembly, and which is operably connected to one or more arrays of light emitting diodes (LEDs) located on the vehicle wheel, particularly in recessed grooves provided in the edges of wheel struts to provide an attention-grabbing luminous glow to the wheel.

It is another object of the invention to improve upon prior art designs such that the bearing assembly including bearing seal slip ring and bearing may be easily replaced. It is another object of the invention so that the external brush assembly may be easily replaced.

These objects are achieved by providing an illuminated wheel assembly comprising: a wheel having electrically operated elements therein; a bearing assembly, the bearing assembly comprising a bearing and a bearing seal slip ring, the bearing seal slip ring having one or more pairs of electrically conductive circles on its exterior surface, the one or more pairs of electrically conductive circles being electrically connected to the electrically operated elements; an external brush assembly, the external brush assembly having spring-loaded contact elements extending axially toward and electrically connecting with the electrically conductive circles; a power supply providing power to the external brush assembly; and desirably, a wheel spacer, the wheel spacer retaining the external brush assembly and the bearing seal slip ring in a fixed relationship. Wiring connecting the electrically operated elements with the power supply system is provided.

The spring-loaded contact elements of the external brush assembly are preferably mounted to a plate which is spring biased with a wave spring, one or more coil springs, or a resilient material such as a neoprene foam.

A method of replacing a stock bearing with a bearing for an illuminated wheel assembly comprises the steps of: providing a bearing housing having a bearing seal and having a perimeter lip for retaining the bearing seal; removing the bearing seal from the bearing housing; replacing the bearing seal with a replacement seal having a slip ring on its outer surface; snapping the replacement seal into the bearing and retaining the replacement seal via the perimeter lip; and threading slip-ring output wiring through the bearing housing so that power is able to be transferred through the bearing housing, and connecting electrically operated elements to the output wiring.

The present invention uniquely provides an illuminated vehicle wheel having a slip ring incorporated into a wheel bearing assembly. The present invention provides a universal design that can be retrofitted to motorcycles wheels made by essentially all manufacturers in the market.

DETAILED DESCRIPTION OF THE INVENTION

Figure 1:
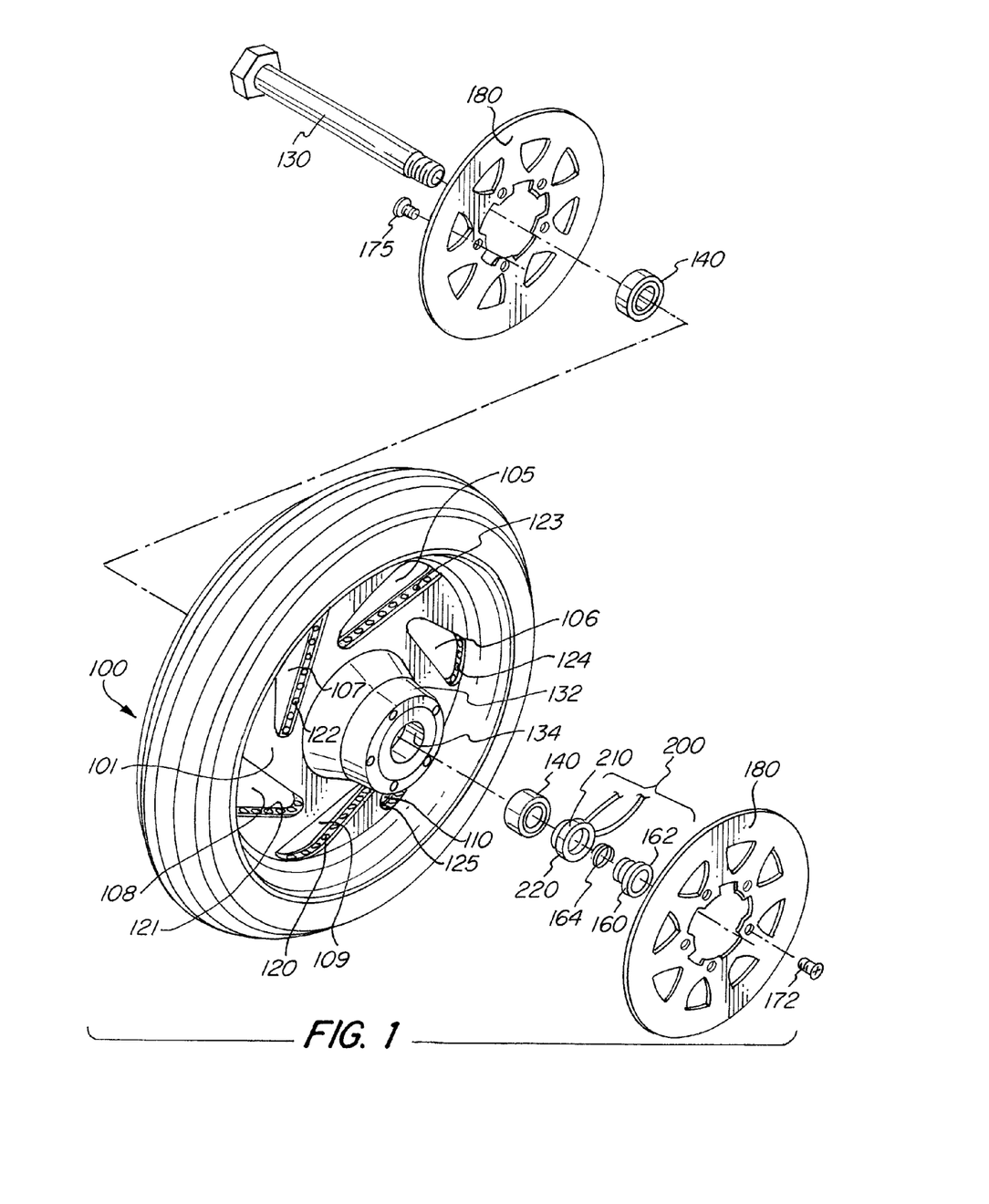
FIG. 1 is an exploded perspective view of a motorcycle illuminated wheel assembly with a bearing seal slip ring assembly in accordance with one embodiment of the invention.

Referring to FIG. 1, a vehicle wheel 100 is shown having strut area 101 and cutaway areas 105, 106, 107, 108, 109 and 110. Arrays of electrically operated illumination elements such as strips of light emitting diodes (LEDs) 120, 121, 122, 123, 124 and 125 are provided in channels which extend around the inner perimeter of the struts (in other words, the LEDs surround the cutaway areas defined by the struts). When power is provided to the LEDs to energize them, the vehicle wheel is illuminated with an eye-catching glow. While FIG. 1 shows the strut area 101 and cutaway areas 105, 106, 107, 108, 109 and 110 of a particular design having triangular cutaway areas, the present invention also provides for cutaway areas be of a circular, oval, or rectangular shape, or other such shapes used for vehicle wheels Wheel 100 has a hub 132 and is associated with an axle 130, and bearing 140. Brake discs 180 are affixed to wheel 100 by screws 172/175.

Slip ring assembly 200 is mounted to the wheel 100, wheel bearing 140, and/or axle 130. Slip ring assembly 200 includes a slip ring 210, an external brush assembly 220, and a spacer 160. The spacer 160 is used to keep the assembly concentric and to prevent crushing or damage to the slip ring 210 and external brush assembly 220.

Motorcycle wheels typically rotate around a stationary axle. In the preferred embodiment of the invention, the slip ring 210 is associated with the rotating wheel, while the external brush assembly 220 is held stationary by mounting it with spacer 160 on the axle 130. The wheel spacer 160 is tubular and has a flange 162 at one axially outward end. Flange 162 retains a coil spring 164, or a plurality of such springs, which press against the external brush assembly 220 and holds the slip ring 210 and the external brush assembly 220 in a spaced relationship with the external brush assembly 220 bearing against the slip ring 210. The spring 164 spring biases contact elements 250 so they electrically connect with one or more pairs of electrically conductive circles 260, 262 on the slip ring 210 to provide power transfer therebetween. The spring loading allow for brush wear and any minor parallel misalignment of the inner and outer portions of the slip ring assembly.

The electrically conductive circles are preferably thin metal stampings or plating fabricated from phosphor-bronze, copper, or cupro-nickel. The contact elements 250 are electrically conductive contact elements as are known in the art, for example, hard carbon brushes, carbon graphite brushes, graphite resin brushes, electro-graphite brushes, or metal graphite brushes. The contact elements 250 may connect to a wire, a contact holder, or may be soldered to conducting surface materials such as phosphor-bronze, copper, or cupro-nickel. Both the slip ring 210 and the external brush assembly 220 are preferably made from an insulating material such as thermoset glass reinforced polyester. Preferably, there are two or more contact elements which are electrically connected in parallel which are positioned in a spacially balanced arrangement which extend towards and contact each one of the conducting circles.

In this application, in order for there to be a closed power supply circuit, there must be both positive and negative terminals. Power is supplied by a positive wire to one contact brush, to one conducting circle, to a positive wire connected to the arrays of LEDs, and returned from the LEDs via a negative wire to a second conducting circle to a second contact brush, to a negative return wire of the power system. Thus a positive wire connects to one contact brush, and a negative wire connects to the other contact brush. The positive and negative wires connect to the motorcycle's electrical system. Accordingly, the electrically conductive circles 260, 262 on the slip ring 210 are provided in pairs since two current paths are needed to allow power to flow in a complete circuit (1) from the motorcycle power system positive voltage source through the electrically operated illumination elements, and (2) back to the motorcycle power system voltage ground.

Wheel spacer 160 has its axially inward end located against the stationary inner race of the wheel bearing, and its flanged axially outward end 162 located against the rear swing-arm, or front forks, of the motorcycle. Wheel spacer 162 is thus retained in a fixed, non-rotating position.

Figure 2:
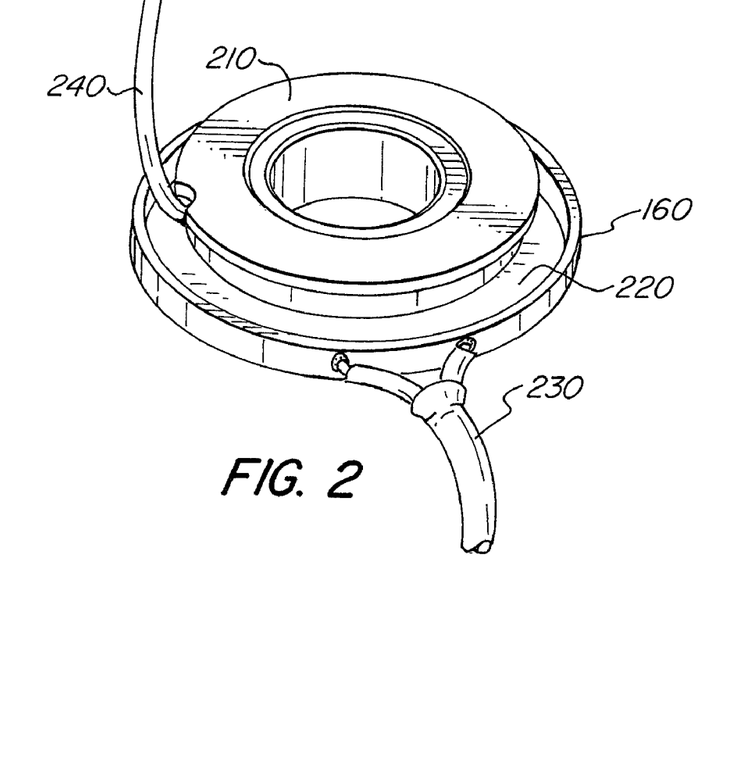
FIG. 2 is a perspective view of a bearing seal slip ring assembly in accordance with one embodiment of the invention.
Figure 3:
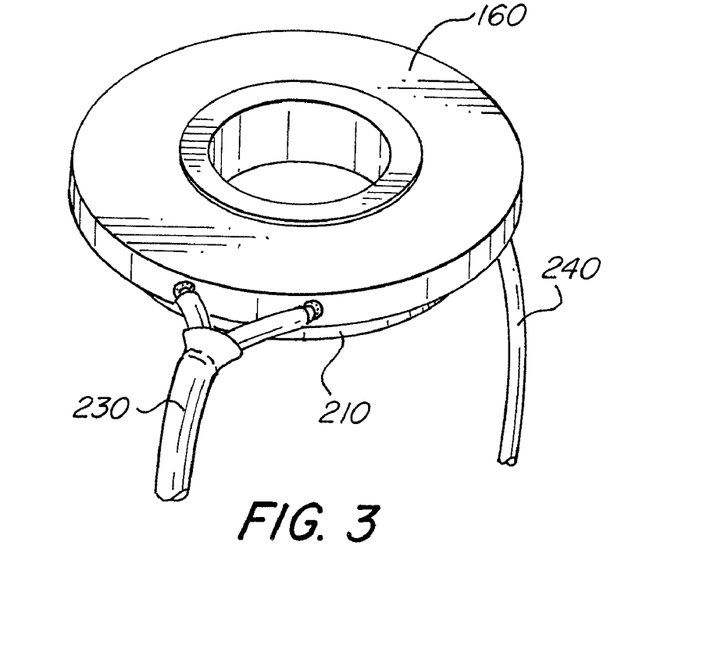
FIG. 3 is a perspective view of the bearing seal slip ring assembly of FIG. 2, which has been turned over.

FIG. 2 shows an embodiment of the invention which is useful in certain vehicle wheel assemblies. This embodiment is well suited and universal to a large portion of Japanese manufactured motorcycles. FIGS. 2 and 3 show a slip ring assembly 200 having a slip ring 210 and an external brush assembly 220. Power leads 230 and 240 are illustrated. One embodiment of a spacer or plug is shown at 160.

Slip ring 210 is preferably associated with the bearing 140 of the wheel 100. For example, slip ring 210 may be adhered to the axially exterior annular surface of the bearing, or installed in or manufactured as part of the bearing seal of bearing 140. Slip ring 210 may be sized to have an outer diameter which is either less than, or approximately equal to the bore 134 of hub 132. A bearing outer diameter is typically 2.050 inches. Slip ring 210 will typically be of a similar size. The slip ring 210 is annular, and has a central aperture with a diameter which will vary, but will typically be 1 inch.

Figure 4:
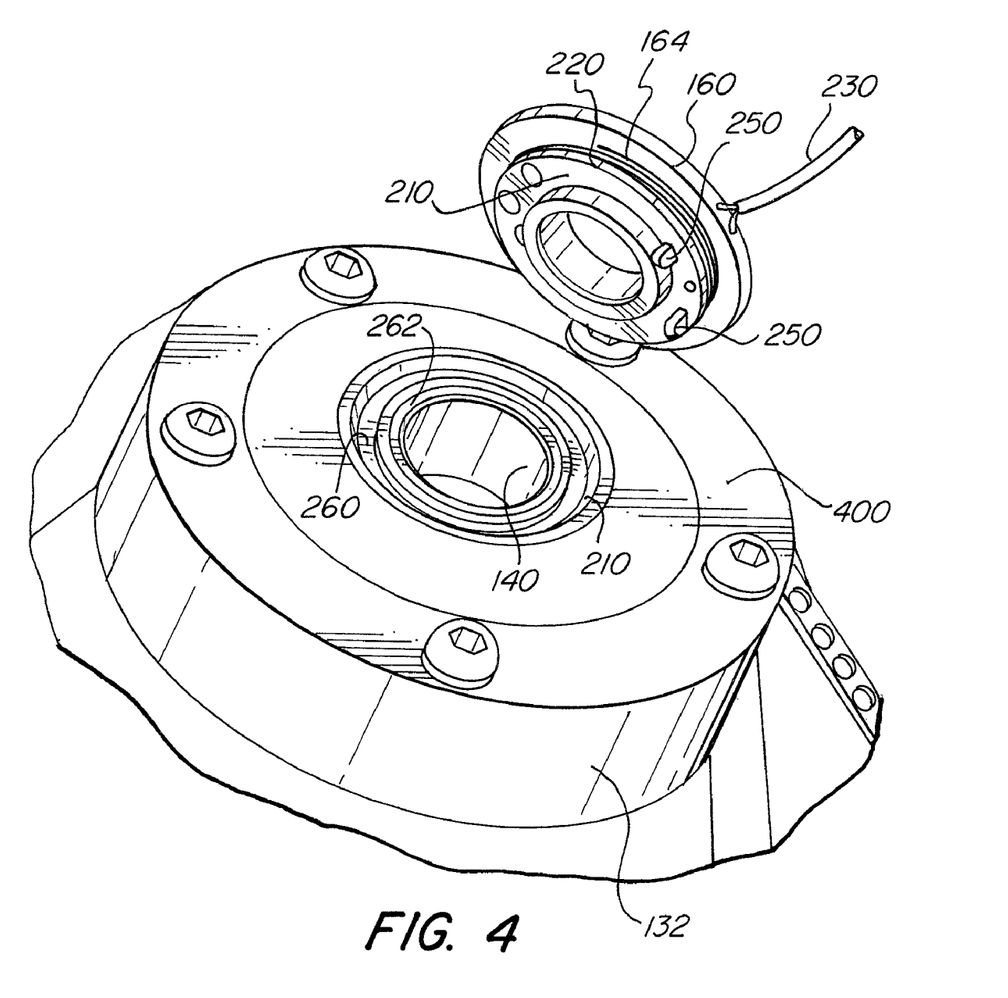
FIG. 4 is a perspective view of the bearing seal slip ring assembly of FIG. 2 being assembled into a bearing of a vehicle wheel.

FIG. 4 illustrates a slip ring assembly in which slip ring 210 is adhered to the bearing 140. The bearing seal slip ring 210 is affixed to the annular surface of axial outward face of bearing 140 and has a diameter which is about equal to the diameter of the bore 134 of hub 132.

The external brush assembly 220 is retained by spacer 160, and has contact elements 250 which extend axially toward and electrically connect with the electrically conductive circles 260, 262 of the bearing seal slip ring 210.

Figure 5:
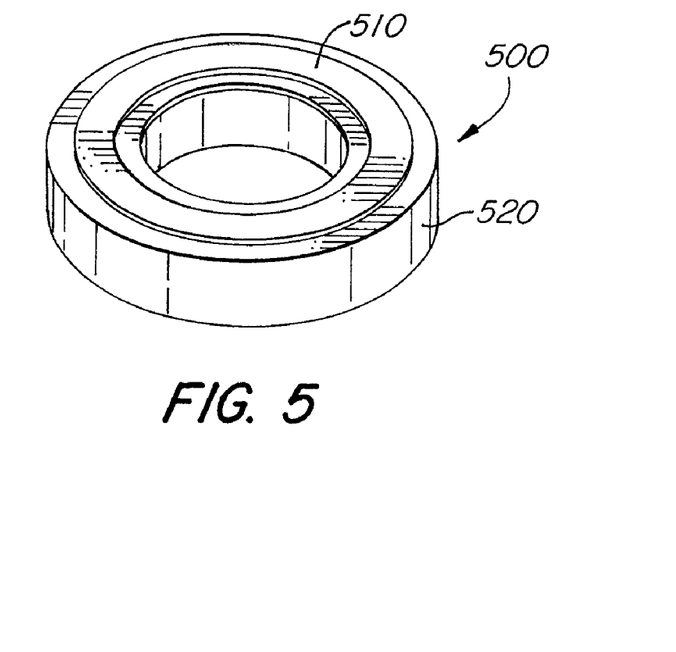
FIG. 5 is a bearing for a vehicle.
Figure 6:
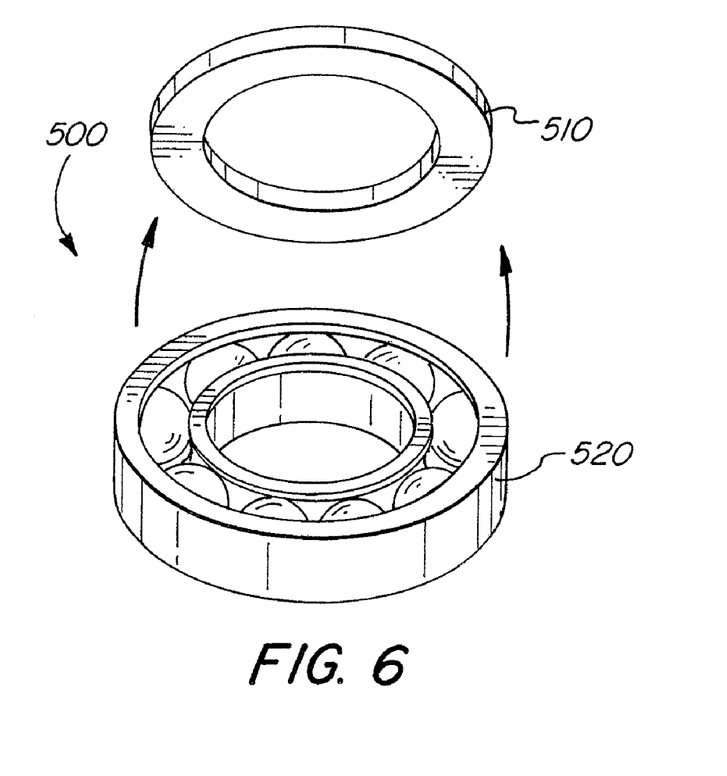
FIG. 6 shows the step of removing the bearing seal of the bearing of FIG. 5.
Figure 7:
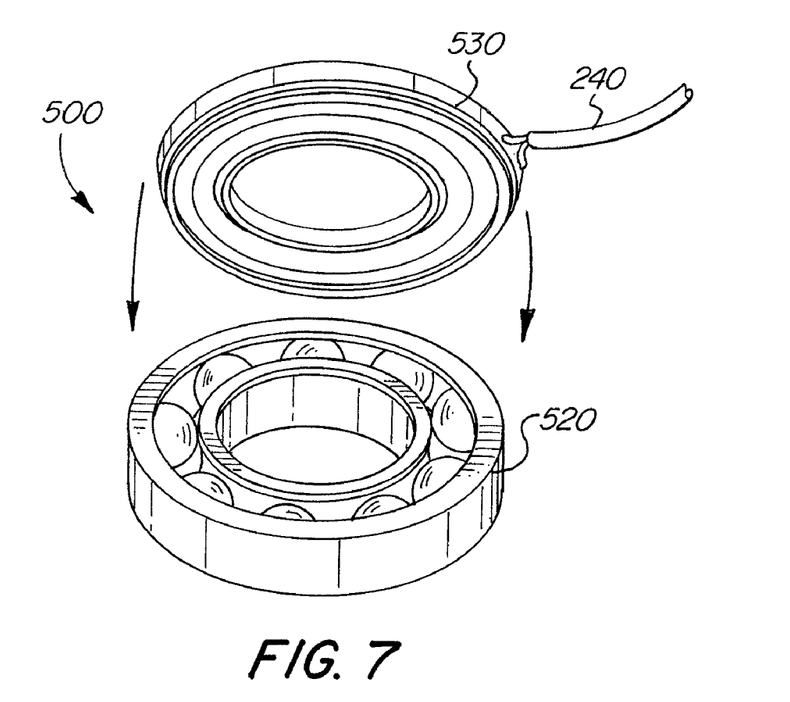
FIG. 7 shows the step of installing a replacement bearing seal slip ring into the bearing of FIG. 5.
Figure 8:
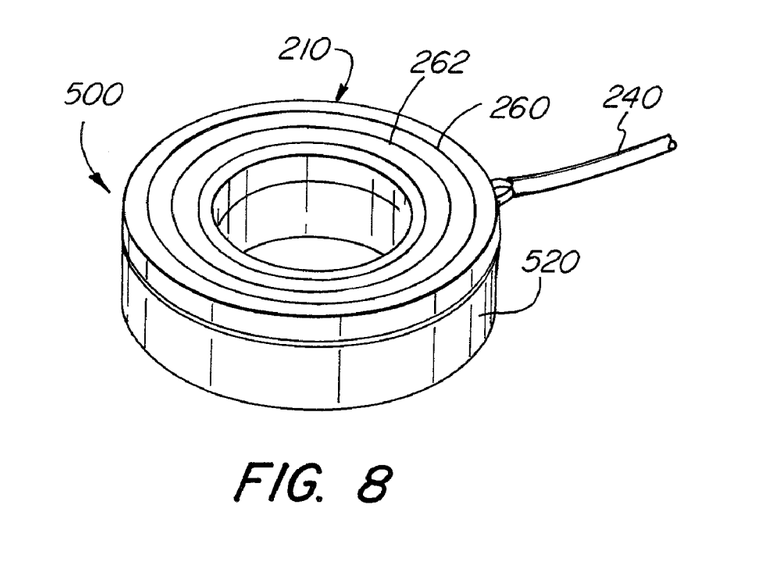
FIG. 8 shows the bearing of FIG. 5 with a replacement bearing seal slip ring installed therein.

The present invention provides an easy retrofit installation in an existing motorcycle wheel. In one embodiment, as seen in FIGS. 5-8, the slip ring 210 may be installed by removing an existing bearing seal and replacing it with a bearing seal slip ring 210. Referring to FIG. 5, a bearing 500 having a bearing seal 510 and a bearing housing 520 is shown. FIG. 6 shows the bearing seal 510 being removed from bearing housing 520. FIGS. 7-8 show the installation of an annular bearing seal 530 which has a slip ring 210 on its outer surface. The annular bearing slip ring 210 is located on the exterior annular surface of the annular bearing seal 530. The bearing slip ring 210 has one or more pairs of electrically conductive circles 260, 262 on its exterior surface. The one or more pairs of electrically conductive circles 260, 262 are electrically connected to power lead 240.

Figure 9:
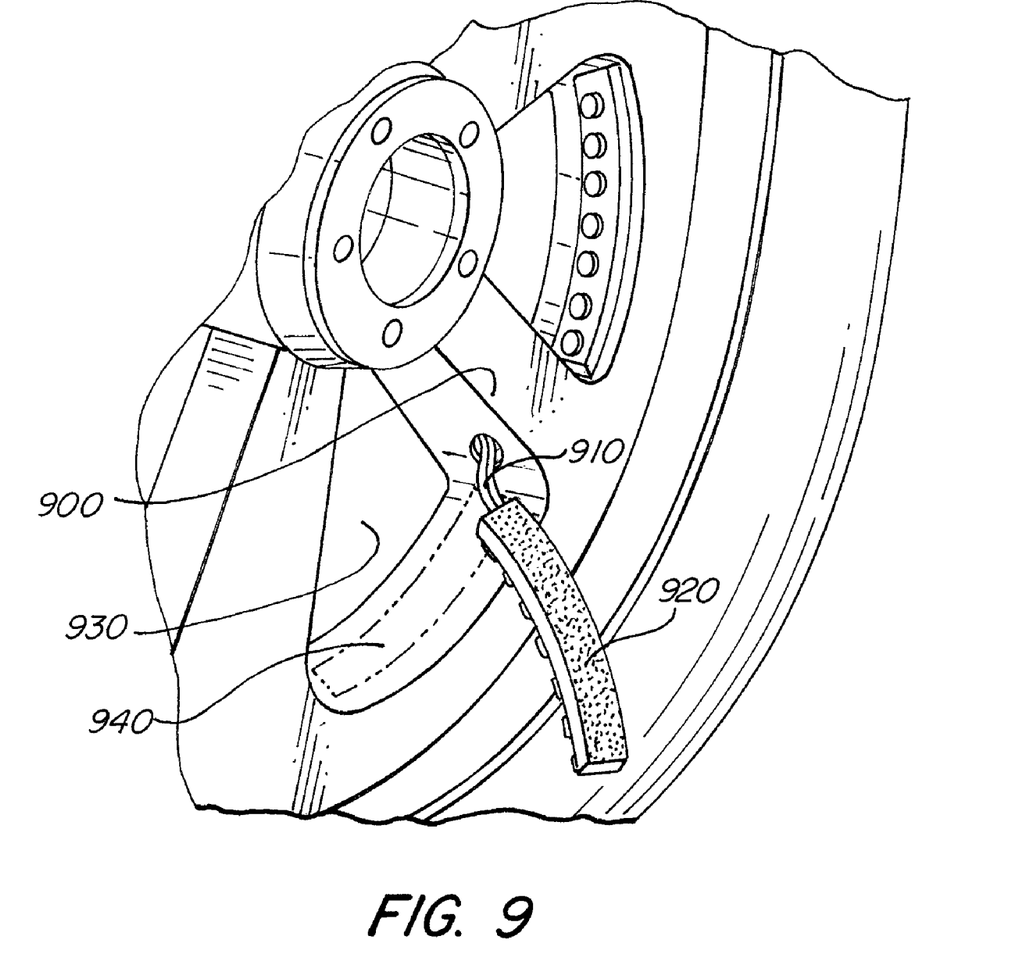
FIG. 9 shows the step of mounting a LED strip in a vehicle wheel.

FIG. 9 illustrated installation of the electrically operated illumination elements such as LEDs 120, 121, 122, 123, 124 and 125. Power leads and wiring are threaded through the vehicle wheel. The wiring connects the motorcycle electrical system to the slip ring assembly 200 through power leads 230, 240. Power from the motorcycle electrical system is transferred through the slip ring assembly 200 to the electrically operated illumination elements. In FIG. 9, output wiring 910 is threaded through a bore in vehicle rim 900. Wiring 910 within the wheel rim 900 may be spliced and run to multiple exit points of the wheel. These can be pre-existing holes or holes added by the owner/installer. LED strips are mounted on the wheels in various forms by double-sided tape 920. Other attachment means such as glue and other attachment means known in the art may be used to connect the LEDs to the wheel rim 900, where wiring 910 is used to power the LEDs and provide an illuminating glow.

Figure 10:
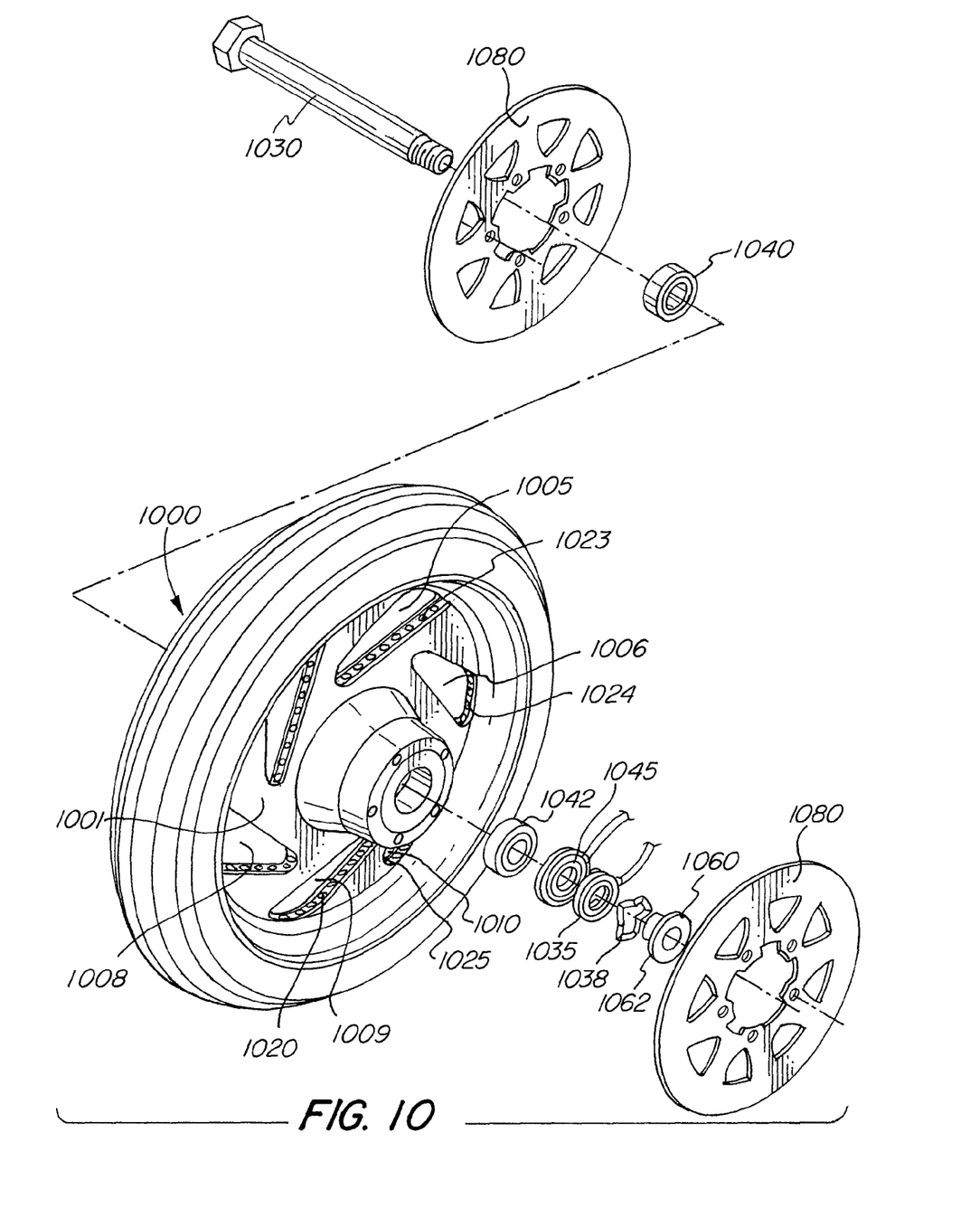
FIG. 10 is an exploded perspective view of a motorcycle illuminated wheel assembly with a bearing seal slip ring assembly in accordance with a second embodiment of the invention.

A preferred embodiment of the invention is shown in FIGS. 10-14. Vehicle wheel 1000 is shown having strut areas 1001 and cutaway areas 1005, 1006, 1007, 1008, 1009 and 1010. Arrays of LEDs 1020, 1023, 1024 and 1025 are provided in annular recesses which extend around the inner perimeter of the struts. FIG. 10 further illustrates the axle 1030, bearing 1042, bearing seal slip ring 1045, external brush assembly 1035, wave spring 1038 and retaining plug/spacer 1060.

FIGS. 11-14 show the preferred embodiment of the slip ring assembly 1100 which includes external brush assembly 1110 and the wheel-mounted slip ring 1200 of the invention.

Figure 11:
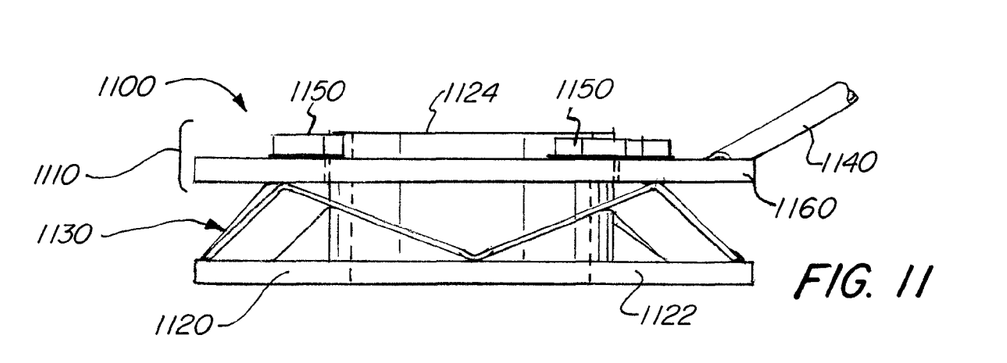
FIG. 11 is a side elevation view of an external brush assembly of the bearing seal slip ring assembly of FIG. 10.
Figure 12:
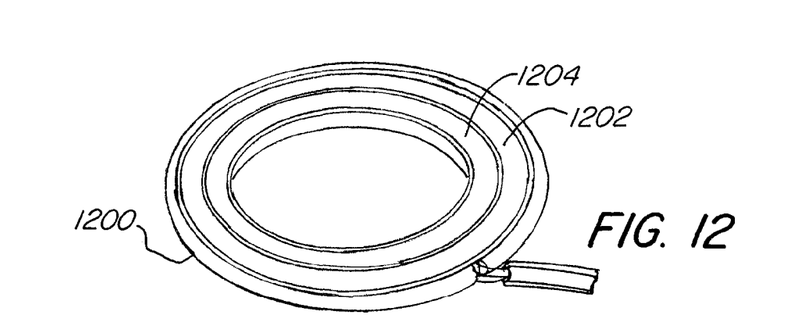
FIG. 12 is perspective view of a bearing seal slip ring of the bearing seal slip ring assembly of FIG. 10.
Figure 13:
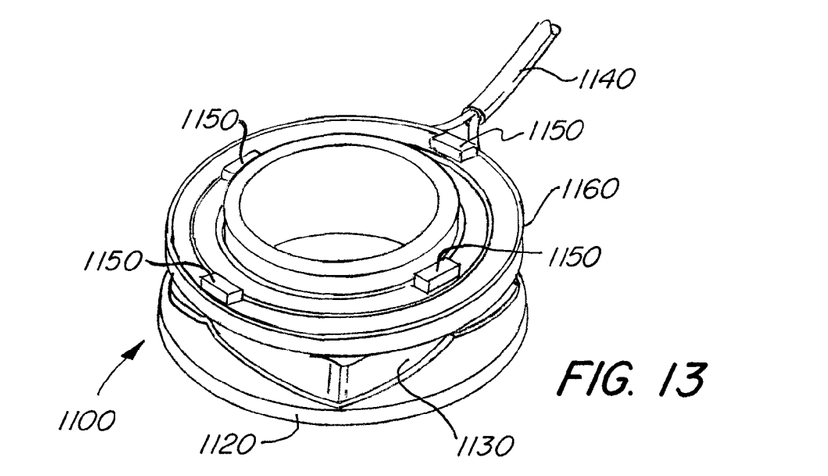
FIG. 13 is a perspective view of the external brush assembly of FIG. 11.
Figure 14:
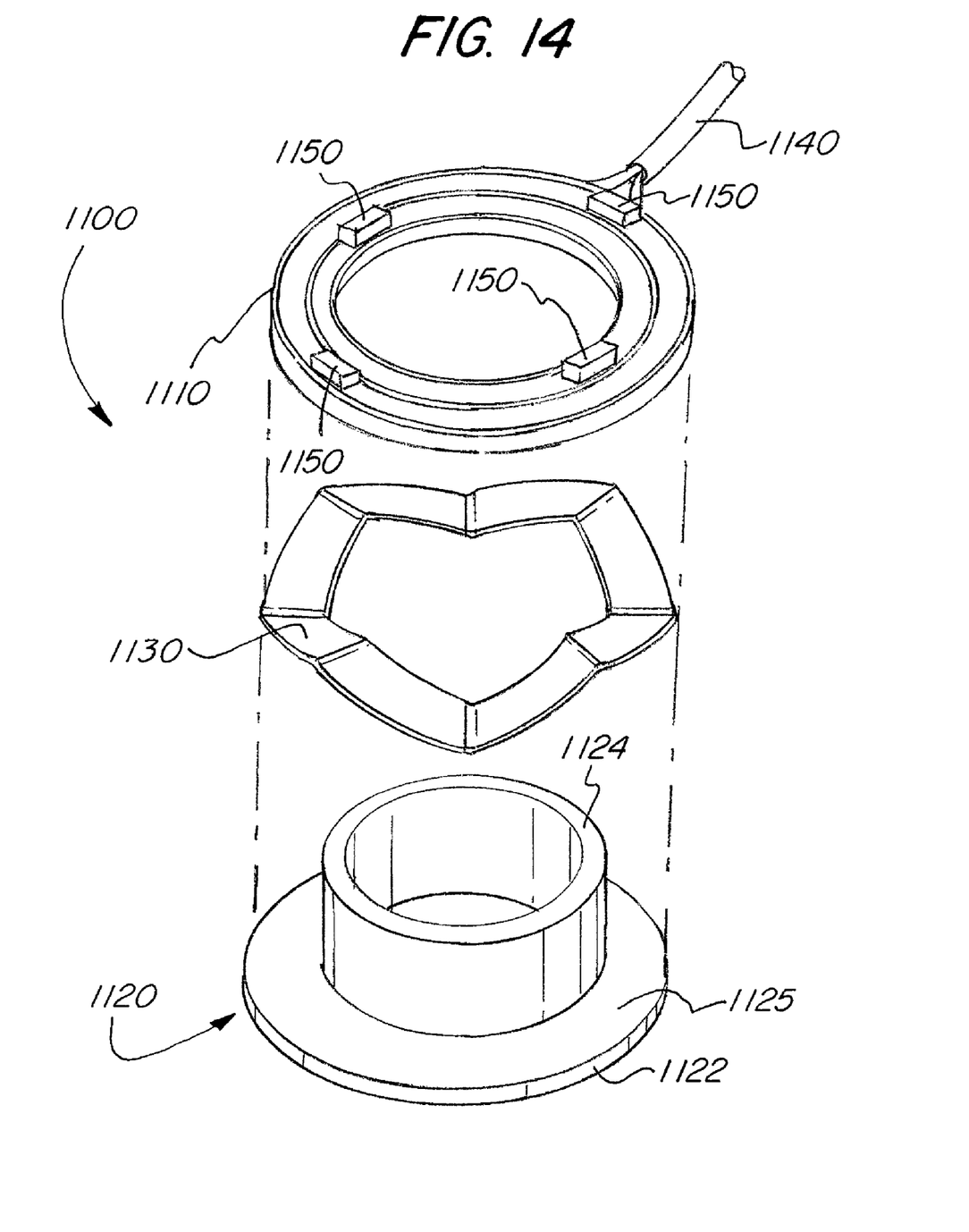
FIG. 14 is an exploded perspective view of the external brush assembly of FIG. 11.

FIGS. 11 and 14 show spacer 1120 having an outer flange 1122 and an opposite unflanged end 1124, which has a smaller diameter than outer flange 1122. Spacer 1120 is tubular and outer flange 1122 is located at one axially outward end. Flange 1122 retains a wave spring 1030 which presses against the external brush assembly 1110 and holds the slip ring 1200 and the external brush assembly 1100 in a spaced relationship with the external brush assembly 1200 bearing against the wheel-mounted slip ring 1100. The spring 1030 spring biases contact elements 1150 so they electrically connect with one or more pairs of electrically conductive circles 1202, 1204 on the slip ring 1200 to provide power transfer therebetween. (Note that FIG. 12 shows the slip ring 1200 oriented so that electrically conductive circles 1202, 1204 are visible, but that in fact, the slip ring 1200 would be turned over to fit onto the external brush assembly 1110 of FIG. 13). Slip ring 1200 is formed of an insulating plastic material and the electrically conductive circles 1202, 1204 are separate metal components adhered to the face of the plastic slip ring, and the slip ring may include an additional plastic housing.

Figure 15:
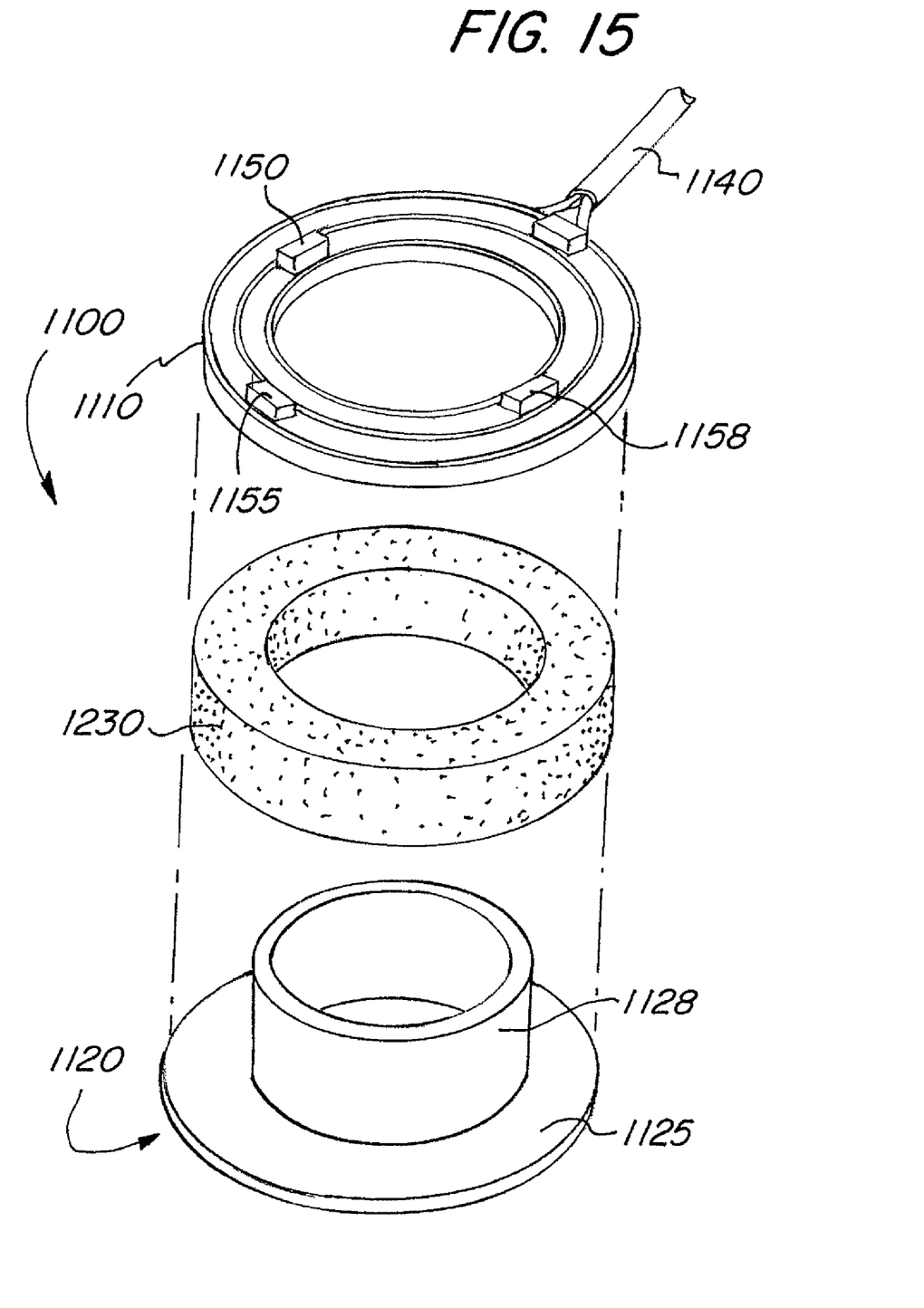
FIG. 15 is an exploded perspective view of an alternative embodiment of an external brush assembly.

In one possible alternative embodiment, shown in FIG. 15, the wave spring is replaced with a resilient pad, such as a neoprene foam pad. The foam pad may be oil and UV resistant. The pad is typically is ⅜" thick. FIG. 15 shows such a pad 1230. The pad 1230 can compress, so that it serves the same purpose as the wave spring.

The universality of the present invention in allowing retrofit into motorcycles wheels made by essentially all manufacturers in the market arises from the use of the above described structure. However, to enable the invention for the broadest number of manufacturers, the following dimensions are most effective.

The outer diameter of the slip ring 210, 1045, 1200 of the above described embodiments is slightly less than 2.000 inches, preferably about 1.925-1.940 inches, and most preferably 1.933 inches. This sizing provides a slip ring outer diameter which is adapted to fit a maximum number of possible manufacturers.

The inner diameter of the slip ring 210, 1045, 1200 of the above described embodiments is preferably about 1.25-130 inches, most preferably about 1.279 inch. This sizing allows clearance between the rotating, wheel mounted slip ring inner diameter and the outer diameter the stationary axle while also allowing room for the wheel spacer.

The slip ring 210, 1045, 1200 of the above described embodiments can be a composite insulating material with or without an additional plastic housing. The additional plastic housing is used to create a snug fit between the outer diameter of the slip ring 210, 1045, 1200 and the wheel bearing bore where it is seated. In cases where the wheel bearing bore does not allow recessed fitment of the slip ring into the bore, the slip ring can be attached to the face of the wheel around the bearing bore. Additionally, if the bearing bore is smaller than the OD of the slip ring assembly, the slip ring assembly may still be attached to the face of the wheel's bearing bore as long as sufficient space is available between the face of the wheel's bearing bore and adjacent components.

The universality of fit is also attributable to the use of the spacer 160, 1060 In general motorcycle wheel spacers serve the function of maintaining the wheel bearing's inner race in its proper location and under compression as to maintain a generally static position as related to the wheel's axle. The wheel can then spin freely around the axle. Typically, wheel spacers are unique to various manufacturers, and to particular models and variations of those models and manufacturers. Consequently, literally dozens if not hundreds of variations can exist.

In the present invention, the spacer 160, 1060 is sized to serve as a universal spacer. It has uniform dimensions with the exception of the internal diameter of the bore of the tubular section. The internal diameter of the bore is determined by the particular make and model of the motorcycle to be fitted with the slip ring assembly. The inner diameter of the tubular bore of the spacer 160, 1060 is preferably 0.75 inches or 1 inch (25 mm) so that it forms a snug fit with the axle and seats against the inner race of the wheel bearing. The outer diameter of the spacer 160, 1060 is 1.25 inch. The length of the spacer 160, 1060 is desirably fixed at a standard length and additional ring-shaped shims are used so the end user can fit the spacer to their particular application. The spacer 160, 1060 when mounted on the axle will concentrically align the wheel spacer mounted brush assembly 220, 1035, 1100 with the wheel mounted slip ring 210, 1045, 1200. The spacer 160, 1060 will also serve to concentrically align a bore face mounted slip ring by virtue of the spacer's outer diameter being within tolerance of the slip ring's inner diameter.

The present invention provides a unique assembly that can be universally applied to motorcycles of many different manufacturers either as OEM equipment or as a retrofit kit without requiring specially sized, fitted, or adapted parts. In contrast to prior art approaches, the present invention provides a practical and universal application that can be implemented without requiring modification of pre-existing components and without requiring the components to be specifically manufactured to fit a particular vendor's components.

Although the invention as presented herein shows the bearing seal slip ring as a rotating element associated with the wheel, and the external brush assembly as a fixed element, the positions of these components may be reversed, and would still be within the scope of the invention.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. An illuminated wheel assembly comprising:
    a wheel having electrically operated illumination elements mounted thereon, and having a hub;
    a bearing assembly located in said wheel hub, said bearing assembly comprising an annular bearing and an annular bearing slip ring located on one annular surface of said annular bearing, said bearing slip ring having one or more pairs of electrically conductive circles on its exterior surface;
    an external brush assembly, said external brush assembly having spring biased contact elements extending axially toward and electrically connecting with said electrically conductive circles;
    a power supply;
    wiring operably connecting said power supply to said external brush assembly;
    wiring operably connecting said one or more pairs of electrically conductive circles of said bearing slip ring to said electrically operated illumination elements.

2. The illuminated wheel assembly of claim 1, further comprising a tubular wheel spacer having a flange at one end, said flange retaining said external brush assembly in a spaced relationship with said bearing slip ring with said external brush assembly bearing against said bearing slip ring with said spring biased contact elements electrically connecting with said one or more pairs of electrically conductive circles to provide power transfer therebetween.

3. The illuminated wheel assembly of claim 1, wherein said contact elements are spring biased by a wave spring.

4. The illuminated wheel assembly of claim 1, wherein said contact elements are spring biased by a resilient foam.

5. The illuminated wheel assembly of claim 1, wherein said bearing slip ring is a bearing seal slip ring which is provided together with a bearing seal.

6. The illuminated wheel assembly of claim 5, wherein said bearing seal slip ring is affixed to a bearing seal.

7. A power transfer assembly comprising:
    a rotating element having electrically operated elements therein, said rotating element rotating on a bearing, the bearing having at least one bearing seal;
    said bearing seal being provided with an exterior surface, and having a bearing seal slip ring on the exterior surface of the bearing seal, the bearing seal slip ring having one or more pairs of electrically conductive circles, said one or more pairs of electrically conductive circles being electrically connected to said electrically operated elements;
    an external brush assembly having spring-loaded contact elements extending axially toward and electrically connecting with said electrically conductive circles.

8. The power transfer assembly of claim 7, further comprising a tubular spacer having a flange at one end, said flange retaining said external brush assembly in a spaced relationship with said bearing seal slip ring with said external brush assembly bearing against said bearing seal slip ring with said spring biased contact elements electrically connecting with said one or more pairs of electrically conductive circles to provide power transfer therebetween.

9. The power transfer assembly of claim 7, wherein said contact elements are spring biased by a wave spring.

10. The power transfer assembly of claim 7, wherein said contact elements are spring biased by a resilient foam.

11. An illuminated wheel assembly comprising:
    a wheel having a hub, and having electrically operated illumination elements therein;
    a bearing assembly located in said wheel hub, said bearing assembly comprising an annular bearing having an annular bearing seal, and an annular bearing seal slip ring located on one annular surface of said annular bearing seal, said bearing seal slip ring having one or more pairs of electrically conductive circles on its exterior surface, said one or more pairs of electrically conductive circles being electrically connected to said electrically operated elements;
    an external brush assembly, said external brush assembly having spring biased contact elements extending axially toward and electrically connecting with said electrically conductive circles;
    a power supply;
    wiring operably connecting said power supply to said external brush assembly;
    wiring operably connecting said one or more pairs of electrically conductive circles of said bearing slip ring to said electrically operated illumination elements; and
    a tubular spacer having a flange at one end, said flange retaining said external brush assembly in a spaced relationship with said bearing seal slip ring with said external brush assembly bearing against said bearing seal slip ring with said spring biased contact elements electrically connecting with said one or more pairs of electrically conductive circles to provide power transfer therebetween.

12. The illuminated wheel assembly of claim 11, wherein said contact elements are spring biased by a wave spring.

13. The illuminated wheel assembly of claim 11, wherein said contact elements are spring biased by a resilient foam.

14. An illuminated wheel assembly comprising:
a wheel having electrically operated illuminated elements therein;
a bearing having at least one bearing seal, said bearing seal being provided with an exterior surface; and a slip ring, said slip ring incorporated into said at least one bearing seal allowing for power to be transferred through said at least one bearing seal to said electrically operated elements via electrical wiring.

15. An illuminated wheel assembly comprising:
a wheel having electrically operated illuminated elements therein;
a bearing having at least one bearing seal, said bearing seal being provided with an exterior surface; and a slip ring, said slip ring incorporated into said at least one bearing seal allowing for power to be transferred through said at least one bearing seal to said electrically operated illuminated elements via electrical wiring;
an external brush assembly having brushes and spring-loaded contact elements extending axially toward and electrically connecting with said electrically conductive circles, said slip seal assembly being retained in a fixed position by a wheel spacer; and
a power supply providing power to said spring-loaded contact elements.

16. A method of modifying a stock bearing with a bearing for an illuminated wheel assembly comprising the steps of:
removing a bearing seal from a stock bearing housing;
seating a replacement seal having a slip ring on its outer surface in the bearing housing in the location of the removed bearing seal; and
threading slip ring output wiring from said bearing into a channel in the illuminated wheel and electrically connecting the slip ring output wiring to electrically operated illuminated elements.

* * * * *